US007483698B2

(12) United States Patent
Hurtta

(10) Patent No.: US 7,483,698 B2
(45) Date of Patent: Jan. 27, 2009

(54) PROVIDING ROAMING STATUS INFORMATION FOR SERVICE CONTROL IN A PACKET DATA BASED COMMUNICATION NETWORK

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 181 days.

(21) Appl. No.: 10/855,899

(22) Filed: May 28, 2004

(65) Prior Publication Data

US 2005/0239458 A1    Oct. 27, 2005

(30) Foreign Application Priority Data

Apr. 26, 2004    (FI) ................................. 20040583

(51) Int. Cl.
*H04Q 7/20*    (2006.01)
(52) U.S. Cl. .................. 455/432.1; 455/403; 455/461; 370/401; 370/331
(58) Field of Classification Search ............. 455/432.1, 455/461; 370/401, 331
See application file for complete search history.

(56) References Cited

U.S. PATENT DOCUMENTS 6,628,954 B1 *   9/2003   McGowan et al.   ......... 455/461
6,961,563 B2 *  11/2005   Holler et al.    ............. 455/432.1
2001/0019544 A1 *   9/2001   Bakke et al.    ................. 370/331
2002/0151312 A1    10/2002   Bos et al.
2005/0025164 A1 *   2/2005   Kavanagh et al.   ........... 370/401
2005/0266842 A1 * 12/2005   Nasielski et al.   ......... 455/432.1

FOREIGN PATENT DOCUMENTS

WO    WO 0213567 A1 *   2/2002
WO    WO 2004/029854 A2    4/2004

* cited by examiner

*Primary Examiner*—Vincent P. Harper
*Assistant Examiner*—Charles Shedrick
(74) *Attorney, Agent, or Firm*—Squire, Sanders & Dempsey, LLP

(57) ABSTRACT

A method for providing roaming status information for service control in a packet data based mobile communication network including one or more terminal devices. In response to a change detected in the state of a connection between a terminal device and a gateway node, roaming status information on the terminal device is derived and a request is made for service policy for the subscriber of the terminal device. The request, including the derived roaming status information, is sent from the gateway node to a session control means. A service policy indicating which subscriber services are allowed for the subscriber and rules for the subscriber services is generated.

38 Claims, 2 Drawing Sheets

PROVIDING ROAMING STATUS INFORMATION FOR SERVICE CONTROL IN A PACKET DATA BASED COMMUNICATION NETWORK

BACKGROUND OF THE INVENTION

1. Field of the Invention

The invention relates to communication networks. In particular, the invention relates to providing roaming status information for controlling services in a packet data based communication network in a novel and improved way.

2. Description of the Related Art

Recently also mobile communication networks have started to support transmission of packet switched data or packet data in addition to traditional circuit switched data transmission.

An example of a technique allowing packet data transmission for mobile communication networks is General Packet Radio Service (GPRS). GPRS is designed to support e.g. digital mobile telecommunication networks based on the Global System for Mobile Communications (GSM) standard. However, GPRS is not restricted to only GSM networks but may support for example 3$^{rd}$ Generation Partnership Project (3GPP) based digital mobile telecommunication networks. Other examples of packet data based mobile communication networks are Wireless Local Area Network (WLAN) and Code Division Multiple Access (CDMA) based mobile communication networks.

A GPRS enabled mobile communication network comprises supplementary network elements or nodes in addition to existing network elements. These include a Serving GPRS Support Node (SGSN) and a Gateway GPRS Support Node (GGSN). An SGSN typically delivers packets to and from GPRS enabled terminal devices within its service area. A GGSN is typically used as an interface to external IP networks such as the Internet, other mobile service providers' GPRS services, or enterprise intranets.

The introduction of packet data based mobile communication networks has naturally resulted in various value-added subscriber services being provided for these packet data based mobile communication networks. Examples of such subscriber services are packet data based voice, email, content downloading, browsing, streaming and rich calls. Furthermore, packet data based mobile communication networks offer network services to support the usage of subscriber services. Such network services include e.g. rerouting, barring, accounting, content proxy services, content blocking services, firewall services, virus scanning services, performance enhancement proxy services, Virtual Private Network (VPN) services, various Quality of Service (QoS) related services and various charging related services for both online and offline charging.

A recent trend is to provide the various subscriber services for packet data based mobile communication networks in a subscriber specific manner. For example, based on definitions in a subscription profile of a given subscriber, it may be determined whether the subscriber will be allowed a given subscriber service out of a plurality of subscriber services. Furthermore, if a given subscriber service is allowed, a Quality of Service class and bit rate(s) for the subscriber service may be determined based on the subscription profile. Furthermore, charging for the subscriber service may depend on data in the subscription profile. The subscription profile typically comprises a set of definitions or parameters defining which subscriber services and how are to be provided to the subscriber. Typically, when a subscriber subscribes to a new subscriber service or e.g. updates an already subscribed subscriber service, a network operator updates the subscription profile correspondingly.

However, there is one parameter which today cannot be taken into account when determining which subscriber services and how are to be provided to a subscriber of packet data based mobile communication network. That parameter is roaming status of a subscriber. As is known in the art, in the context of mobile communication networks, when a subscriber connects via a service area that is managed by an operator other than the one with whom the subscriber originally registered with, the subscriber is said to be 'roaming'. A typical example of a subscriber roaming is when the subscriber is in a foreign country. In contrast, when the subscriber connects via a service area that is managed by the operator with whom the subscriber originally registered with, the subscriber is said to be at 'home'.

Obviously, it would be highly desirable to be able to take into account roaming status of a subscriber at a given moment when determining which subscriber services and how are to be provided to the subscriber at that moment. For example, different subscriber services may be available when roaming or at home, different charging and/or QoS might be applied on a subscriber service depending on whether the subscriber is at home or roaming.

Yet, today this is not possible for packet data based mobile communication networks since the existing packet data based mobile communication networks do not provide a mechanism that would allow providing roaming status information for service control.

Therefore, the object of the present invention is to alleviate the problems described above and to introduce a mechanism that allows providing roaming status information for service control.

SUMMARY OF THE INVENTION

A first aspect of the present invention is a method of providing roaming status information for service control in a packet data based mobile communication network comprising one or more terminal devices. The term 'subscriber service' is used to refer to a value-added subscriber service such as e.g. those described above.

A change in the state of a connection between a terminal device and a gateway node of the mobile communication network is detected. In an embodiment of the invention the detected change is a received request for access bearer establishment, such as e.g. a received 'Create PDP Context Request' in case of GPRS. In another embodiment, the detected change is a received request for access bearer modification, such as e.g. a received 'Update PDP Context Request' in case of GPRS. The term 'access bearer' is used to refer to an information transmission path of defined property, e.g. of a security tunnel, which access bearer is explicitly established across an access network, between a terminal device and an access terminating gateway. One example of access bearer is the PDP context in GPRS system. In another embodiment the detected change is a detected new service flow. The term 'service flow' is used to refer to a set of packet flows, defined by the L3-L7 and above lookup criteria. In the context of the present invention, a service flow is the lowest flow granulation to which a different set of service rules may be applied.

In response to the detected change, roaming status information on the terminal device is derived at the gateway node. Next, a request for service policy for the subscriber of the terminal device is sent from the gateway node to a session control means of the mobile communication network. The request for service policy comprises the derived roaming status information.

Based on the received request for service policy and the roaming status information comprised therein, a service policy is generated at the session control means. The service policy indicates which subscriber services are allowed for the subscriber and rules for the subscriber services. After the service policy has been generated, it is forwarded to the gateway node which may then proceed to support subscriber services according to the received service policy.

The session control means may be comprised in a separate network element. Alternatively the session control means may be integrated with a network element that also has other functions besides those of the session control means. For example, the session control means may be integrated with the gateway node of the present invention.

A second aspect of the present invention is a system of providing roaming status information for service control in a packet data based mobile communication network. The system comprises one or more terminal devices. The system further comprises a gateway node comprising a detecting means for detecting a change in the state of a connection between a terminal device and the gateway node. The gateway node further comprises a deriving means for deriving roaming status information on a terminal device for which a change has been detected. The gateway node further comprises a policy request means for sending a request for service policy for the subscriber of the terminal device for which a change has been detected, which request for service policy comprises the derived roaming status information. The system further comprises a session control means for generating, based on the request for service policy received from the gateway node and the roaming status information comprised therein, a service policy indicating which subscriber services are allowed for the subscriber and rules for the subscriber services.

A third aspect of the present invention is a network node comprising a detecting means for detecting a change in the state of a connection between a terminal device of a packet data based mobile communication network and a gateway node of the mobile communication network. The network node further comprises a deriving means for deriving roaming status information on the terminal device in response to the detected change. The network node further comprises a policy request means for sending a request for service policy for the subscriber of the terminal device, which request comprises the derived roaming status information. The service policy is to indicate which subscriber services are allowed for the subscriber and rules for the subscriber services.

A fourth aspect of the present invention is a network node comprising a session control means for generating, based on a request received from a gateway node of a packet data based mobile communication network which request comprises roaming status information on a terminal device of the mobile communication network for which terminal device a change has been detected in the state of a connection between the terminal device and the gateway node, a service policy indicating which subscriber services are allowed for the subscriber and rules for the subscriber services.

A fifth aspect of the present invention is a computer program comprising code adapted to perform the following steps when executed on a data-processing device. A change is detected in the state of a connection between a terminal device of a packet data based mobile communication network and a gateway node of the mobile communication network. Roaming status information on the terminal device is derived.

A request for service policy for the subscriber of the terminal device is sent from the gateway node to a session control means of the mobile communication network, which request comprises the derived roaming status information. Based on the received request and the roaming status information comprised therein, a service policy indicating which subscriber services are allowed for the subscriber and rules for the subscriber services.

In an embodiment of the invention, the packet data based mobile communication network is an Internet Protocol (IP) based mobile communication network.

In an embodiment of the invention, the Internet Protocol based mobile communication network comprises a Wireless Local Area Network. In an embodiment of the invention, the gateway node is a Packet Data Gateway (PDG) of the Wireless Local Area Network.

In an embodiment of the invention, the Internet Protocol based mobile communication network comprises a General Packet Radio Service enabled mobile telecommunication network. In an embodiment of the invention, the gateway node is a Gateway GPRS Support Node of the General Packet Radio Service enabled mobile telecommunication network.

In an embodiment of the invention, the Internet Protocol based mobile communication network comprises a Code Division Multiple Access based network. In an embodiment of the invention, the gateway node is a Packet Data Serving Node (PDSN) of the Code Division Multiple Access based network.

In an embodiment of the invention, the roaming status information is derived on the basis of location information received from a Serving GPRS Support Node of the General Packet Radio Service enabled mobile telecommunication network serving the terminal device.

In an embodiment of the invention, the roaming status information is derived on the basis of a Routing Area Identity (RAI) information element received from a Serving GPRS Support Node of the General Packet Radio Service enabled mobile telecommunication network serving the terminal device.

In an embodiment of the invention, the roaming status information is derived on the basis of an Internet Protocol address of a serving node serving the terminal device, e.g. on the basis of an Internet Protocol address of a Serving GPRS Support Node of the General Packet Radio Service enabled mobile telecommunication network serving the terminal device.

In an embodiment of the invention, the roaming status information comprises information about whether the terminal device is roaming or not. In an embodiment of the invention, the roaming status information comprises information about the network in which terminal device is at that moment.

In an embodiment of the invention, if the roaming status information changes during the established access bearer, the changes are forwarded to the session control means and the service policy is amended correspondingly. In another embodiment of the invention, if the roaming status information changes during the detected service flow, the changes are forwarded to the session control means and the service policy is amended correspondingly.

In an embodiment of the invention, subscription data associated with the subscriber of the terminal device is acquired from a subscriber database of the mobile communication network to be utilized in generating the service policy, which subscription data comprises roaming status specific subscription attributes. The subscriber database may be, for example, a Home Location Register in a General Packet Radio Service enabled mobile telecommunication network.

In an embodiment of the invention, the session control means comprises pre-configured data to be utilized in generating the service policy, which pre-configured data comprises roaming status specific attributes.

In an embodiment of the invention, application session data is received from an application function means to be utilized in generating the service policy, which application session data comprises roaming status specific application session attributes. In an embodiment, 'application function means' is a network element of a 3rd Generation Partnership Project telecommunication network called Application Function (AF), which provides applications that require control of Internet Protocol bearer resources.

The present invention allows providing roaming status information for service control in a packet data based mobile communication network. As a result, decisions concerning which subscriber services to provide and how can be made in a more flexible manner. For example, different subscriber services may be available when roaming or at home, different charging and/or QoS may be applied when at home and when roaming.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
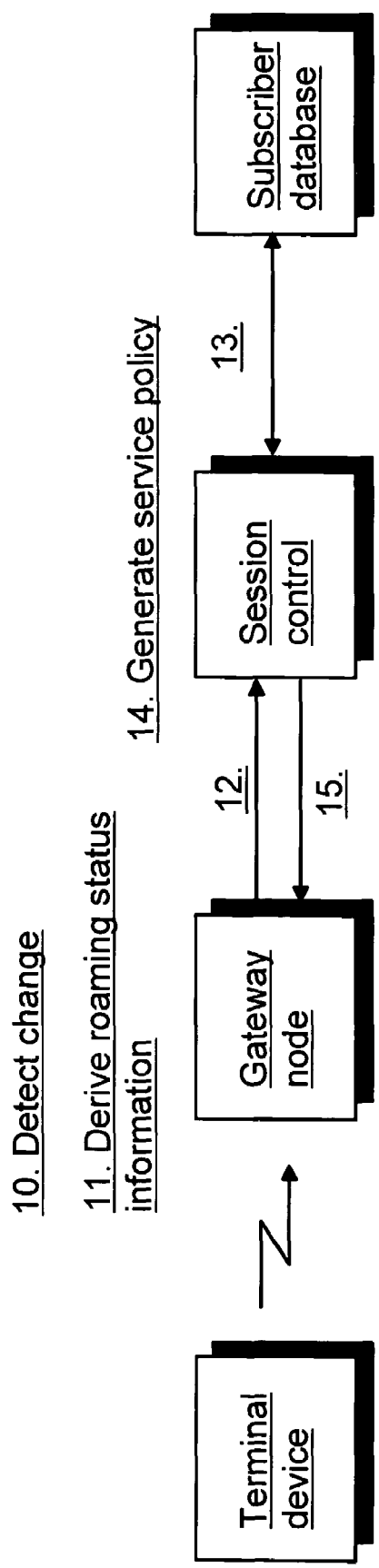
FIG. 1 is a graphical representation illustrating a method according to an embodiment of the present invention.

FIG. 1 illustrates an exemplary embodiment of the method of the present invention relating to providing roaming status information for service control in a packet data based mobile communication network. At step 10 a change in the state of a connection between a terminal device of a packet data based mobile communication network and a gateway node of the mobile communication network is detected.

In response to the detected change, roaming status information on the terminal device is derived at the gateway node, step 11. Next, a request for service policy for the subscriber of the terminal device is sent from the gateway node to a session control means of the mobile communication network, step 12. The request for service policy comprises the derived roaming status information.

At step 13, subscription data associated with the subscriber of the terminal device is acquired from a subscriber database of the mobile communication network. The acquired subscription data will be utilized in generating the service policy. The subscription data may comprise roaming status specific subscription attributes.

At step 14, based on the received request and the roaming status information comprised therein as well as the acquired subscription data, a service policy is generated at the session control means. The generated service policy indicates which subscriber services are allowed for the subscriber and rules for the subscriber services. The session control means may further comprise pre-configured data which is utilized in generating the service policy. The pre-configured data may in turn further comprise roaming status specific attributes.

After the service policy has been generated, it may be utilized in a suitable way to provide subscriber services. FIG. 1 further illustrates an exemplary implementation of how to utilize the generated service policy. First, at step 15, the generated service policy is sent to the gateway node. The gateway node then enforces the generated service policy.

Figure 2:
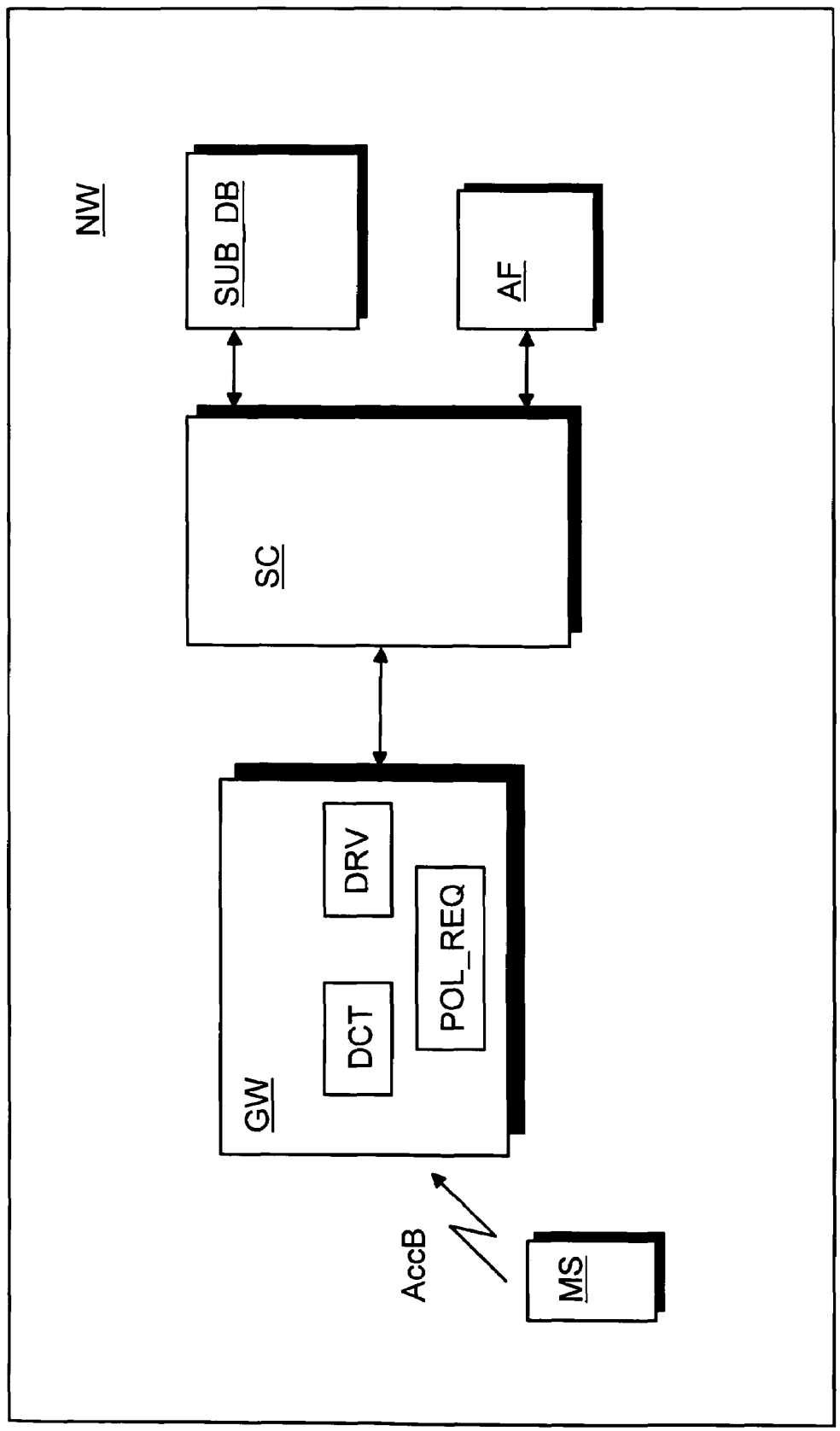
FIG. 2 is a block diagram illustrating a system according to an embodiment of the present invention.

FIG. 2 illustrates an exemplary embodiment of the system of the present invention relating to providing roaming status information for service control in a packet data based mobile communication network. The packet data based mobile communication network NW may be e.g. an Internet Protocol based mobile communication network, and it may comprise a General Packet Radio Service enabled mobile telecommunication network. Alternatively or additionally the mobile communication network NW may comprise e.g. a Wireless Local Area Network or Code Division Multiple Access based network.

The exemplary system of FIG. 2 comprises terminal devices MS, one of which is illustrated in FIG. 2.

The exemplary system of FIG. 2 further comprises a gateway node GW. The gateway node GW may be e.g. a Gateway GPRS Support Node of the General Packet Radio Service enabled mobile telecommunication network. Alternatively the gateway node may be e.g. a Packet Data Gateway of the Wireless Local Area Network or a Packet Data Serving Node of the Code Division Multiple Access based network.

The gateway node GW comprises a detecting means DCT for detecting a change in the state of a connection between a terminal device MS and the gateway node GW. The detected change may be a request for establishing or modifying an access bearer AccB between the terminal device MS and the gateway node GW received to the gateway node GW from the terminal device MS. If the mobile communication network NW comprises a General Packet Radio Service enabled mobile communication network, the received request for access bearer establishment may be e.g. a 'Create PDP Context Request' message received from the terminal device MS via a Serving GPRS Support Node to a Gateway GPRS Support Node acting as the gateway node GW of the present invention. And the received request for access bearer modification may be e.g. a 'Update PDP Context Request' message received from a Serving GPRS Support Node to a Gateway GPRS Support Node acting as the gateway node GW of the present invention. Alternatively the detected change may be a detected new service flow.

The gateway node GW further comprises a deriving means DRV for deriving roaming status information on the terminal device MS in response to the detected change. The deriving means DRV may derive the roaming status information e.g. from location information, e.g. from a Routing Area Identity information element, which was comprised in the message for access bearer establishment, e.g. 'Create PDP Context Request', or in the message for access bearer modification, e.g. 'Update PDP Context Request', received above. As is known in the art, location information, e.g. a Routing Area Identity information element, typically comprises a Mobile Country Code (MCC) and a Mobile Network Code (MNC) which may be utilized in determining whether the terminal device MS is roaming or at home. If the received Mobile Country Code and the Mobile Network Code equals to the Mobile Country Code and the Mobile Network Code of the gateway node GW, the terminal device MS is considered to be at home. Otherwise, the terminal device is considered to be roaming. Alternatively, the deriving means DRV may derive the roaming status information based on the Internet Protocol address of the serving node, e.g. Serving GPRS Support Node, which is serving the terminal device MS at the moment.

The derived roaming status information may comprise information about whether the terminal device is roaming or not. The roaming status information may comprise information about the network in which the terminal device is at that moment, e.g. in the form of the Mobile Country Code and the Mobile Network Code.

The gateway node GW further comprises a policy request means POL_REQ for sending a request for service policy for the terminal device MS. The request for service policy comprises the derived roaming status information.

The exemplary system of FIG. 2 further comprises a session control means SC for generating a service policy based on the request for service policy received from the gateway node GW and the roaming status information comprised therein. The session control means may comprise an authorization function, a function for control of charging, e.g. the Service Data Flow Based Charging Rules Function of 3GPP, a function for control of QoS, e.g. the Policy Decision Function of 3GPP, and/or a credit control function, e.g. the Service Data Flow Based Credit Control of 3GPP. The service policy indicates which subscriber services are allowed for the subscriber and rules, e.g. charging rules and/or QoS rules, for the subscriber services. The session control means SC may further comprise pre-configured data which may be utilized in generating the service policy in addition to the data received from the gateway node GW in the request for service policy. The pre-configured data may comprise roaming status specific attributes.

The session control means SC may be configured to send the generated service policy to the gateway node GW. The gateway node GW may in turn be configured to enforce the service policy.

The gateway node GW may be further configured to forward, if the roaming status information changes during the established access bearer or during the detected service flow, the changes to the session control means SC and the session control means SC may be further configured to amend the service policy correspondingly.

The exemplary system of FIG. 2 further comprises a subscriber database SUB_DB. The subscriber database may be e.g. a Home Location Register of the mobile communication network. The session control means SC is further configured to acquire subscription data associated with the subscriber of the terminal device MS from the subscriber database SUB_DB to be utilized in generating the service policy. Alternatively, the gateway node GW may be configured to acquire subscription data associated with the subscriber from the subscriber database SUB_DB. In the exemplary system illustrated in FIG. 2 the subscription data comprises roaming status specific subscription attributes.

The exemplary system of FIG. 2 further comprises an application function means AF. The session control means SC is further configured to receive application session data associated with the terminal device MS from the application function means AF to be utilized in generating the service policy. In the exemplary system illustrated in FIG. 2 the application data comprises roaming status specific application session attributes.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method, comprising:
    detecting a change in a state of a connection between a terminal device and a gateway node of a packet data based mobile communication network, wherein the mobile communication network comprises one or more terminal devices;
    deriving, at the gateway node, roaming status information on the terminal device; and
    sending a request for service policy for a subscriber of said terminal device from the gateway node to a session controller of the mobile communication network, said request comprising the roaming status information for service control in the mobile communication network, wherein said service policy indicates which subscriber data services are allowed for said subscriber and further indicating rules for allowed subscriber data services, said rules indicating at least one of different charges and different quality of services for the allowed subscriber data services of said terminal device when roaming, compared to when at home.

2. The method according to claim 1, wherein the deriving of the roaming status information is performed based on a routing area identity information element received from a serving general packet radio service support node of a general packet radio service enabled mobile telecommunication network, wherein the mobile communication network comprises the serving general packet radio service support node.

3. The method according to claim 1, wherein the deriving of the roaming status information is performed based on an internet protocol address of a serving node serving the terminal device.

4. The method according to claim 1, wherein the deriving of the roaming status information comprises deriving the roaming status information to comprise information about whether the terminal device is roaming.

5. The method according to claim 1, wherein the deriving of the roaming status information comprises deriving the roaming status information to comprise information about the network in which the terminal device is at that moment.

6. The method according to claim 1, wherein, in the detecting of the change in the state of the connection, the change comprises a received request for access bearer establishment.

7. The method according to claim 1, wherein, in the detecting of the change in the state of the connection, the change comprises a detected new service flow.

8. The method according to claim 6, further comprising:
    forwarding changes in the roaming status information during the access bearer establishment to the session controller; and
    amending the service policy correspondingly.

9. The method according to claim 7, further comprising:
    forwarding changes in the roaming status information during the access bearer establishment to the session controller; and
    amending the service policy correspondingly.

10. The method according to claim 1, further comprising:
    acquiring subscription data associated with the subscriber of the terminal device from a subscriber database of the mobile communication network to be utilized in generating the service policy, said subscription data comprising roaming status specific subscription attributes.

11. The method according to claim 1, further comprising:
    generating the service policy utilizing pre-configured data, wherein the session controller comprises the pre-configured data, said pre-configured data comprising roaming status specific attributes.

12. The method according to claim 1, further comprising:

receiving application session data from an application function unit, wherein said application session data is to be utilized in generating the service policy, said application session data comprising roaming status specific application session attributes.

13. A system, comprising:
- at least one terminal device of a packet data based mobile communication network;
- a gateway node comprising a detecting unit configured to detect a change in a state of a connection between the at least one terminal device and the gateway node, said gateway node further comprising a deriving unit configured to derive roaming status information on a particular terminal device of said at least one terminal device for which the change in the state of the connection has been detected, and said gateway node further comprising a policy requestor configured to send a request for a service policy for a subscriber of said particular terminal device, said request comprising the roaming status information for service control in the mobile communication network; and
- a session controller configured to generate, based on said request received from the gateway node and the roaming status information, the service policy indicating which subscriber data services are allowed for said subscriber and further indicating rules for the subscriber data services, said rules indicating at least one of different charges and different quality of services for the allowed subscriber data services of said terminal device when roaming, compared to when at home.

14. The system according to claim 13, wherein the packet data based mobile communication network comprises an internet protocol based mobile communication network comprising a general packet radio service enabled mobile telecommunication network.

15. The system according to claim 13, wherein the system further comprises:
- a subscriber database of the mobile communication network from which subscription data associated with the subscriber of the at least one terminal device is acquired to be utilized in generating the service policy, said subscription data comprising roaming status specific subscription attributes.

16. The system according to claim 14, wherein the system further comprises: an application function unit from which application session data is received configured to generate the service policy, said application session data comprising roaming status specific application attributes.

17. An apparatus, comprising:
- a detector configured to detect a change in a state of a connection between a terminal device of a packet data based mobile communication network and a gateway node of the mobile communication network;
- a deriving unit configured to derive roaming status information on said terminal device in response to said change; and
- a policy requestor configured to send a request for service policy for a subscriber of said terminal device, said request comprising the roaming status information, and said service policy indicating which subscriber data services are allowed for said subscriber and further indicating rules for the subscriber data services, said rules indicating at least one of different charges and different quality of services for the allowed subscriber data services of said terminal device when roaming, compared to when at home.

18. An apparatus, comprising:
- a connector configured to connect the apparatus to a packet data based mobile communication network; and
- a session controller configured to generate a service policy indicating which subscriber data services are allowed for a subscriber of a terminal device and further indicating rules for the subscriber data services, wherein the service policy is based on a request received from a gateway node of said mobile communication network that includes roaming status information on the terminal device of said mobile communication network for which said terminal device a change has been detected in a state of a connection between said terminal device and said gateway node, said rules indicating at least one of different charges and different quality of services for the allowed subscriber data services of said terminal device when roaming, compared to when at home.

19. A computer program embodied on a computer readable medium, said computer program executing a computer process comprising:
- detecting a change in a state of a connection between a terminal device of a packet data based mobile communication network and a gateway node of the mobile communication network;
- deriving roaming status information on the terminal device;
- sending a request for a service policy for a subscriber of said terminal device from the gateway node to a session controller of the mobile communication network, said request comprising the derived roaming status information;
- generating, at the session controller, based on the request and the roaming status information, the service policy indicating which subscriber data services are allowed for said subscriber and further indicating rules for the subscriber data services; and
- applying said rules to indicate at least one of different charges and different quality of services for the allowed subscriber data services of said terminal device when roaming, compared to when at home.

20. An apparatus, comprising:
- detecting means for detecting a change in a state of a connection between a terminal device of a packet data based mobile communication network and a gateway node of the mobile communication network;
- deriving means for deriving roaming status information on said terminal device in response to said change; and
- policy request means for sending a request for service policy for a subscriber of said terminal device, said request comprising the roaming status information, and said service policy indicating which subscriber data services are allowed for said subscriber and further indicating rules for the subscriber data services, said rules indicating at least one of different charges and different quality of services for the allowed subscriber data services of said terminal device when roaming, compared to when at home.

21. An apparatus, comprising:
- connection means for connecting the apparatus to a packet data based mobile communication network; and
- session control means for generating a service policy indicating which subscriber data services are allowed for a subscriber of a terminal device and further indicating rules for the subscriber data services, wherein the service policy is based on a request received from a gateway node of said mobile communication network that includes roaming status information on the terminal device of said mobile communication network for which said terminal device a change has been detected in a state of a connection between said terminal device and said gateway node, said rules indicating at least one of different charges and different quality of services for the allowed subscriber data services of said terminal device when roaming, compared to when at home.

22. A method, comprising:
receiving, at a session controller of a packet data based mobile communication network, a request for service policy for a subscriber of a terminal device of the mobile communication network from a gateway node of the mobile communication network, said request comprising roaming status information on the terminal device for service control in the mobile communication network for which said terminal device a change has been detected in a state of a connection between said terminal device and said gateway node; and
generating, at the session controller, based on the request and the roaming status information comprised therein, a service policy indicating which subscriber data services are allowed for said subscriber and further indicating rules for allowed subscriber data services, said rules indicating at least one of different charges and different quality of services for the allowed subscriber data services of said terminal device when roaming, compared to when at home.

23. The apparatus according to claim 17, wherein the packet data based mobile communication network comprises an internet protocol based mobile communication network.

24. The apparatus according to claim 23, wherein the internet protocol based mobile communication network comprises a wireless local area network, and wherein the gateway node comprises a packet data gateway of the wireless local area network.

25. The apparatus according to claim 23, wherein the internet protocol based mobile communication network comprises a general packet radio service enabled mobile telecommunication network, and wherein the gateway node comprises a gateway general packet radio service support node of the general packet radio service enabled mobile telecommunication network.

26. The apparatus according to claim 23, wherein the internet protocol based mobile communication network comprises a code division multiple access based network, and wherein the gateway node comprises a packet data serving node of the code division multiple access based network.

27. The apparatus according to claim 25, wherein the deriving unit is further configured to derive the roaming status information from a routing area identity information element received from a serving general packet radio service support node of the general packet radio service enabled mobile telecommunication network serving the terminal device.

28. The apparatus according to claim 25, wherein the deriving unit is further configured to derive the roaming status information based on an internet protocol address of a serving node serving the terminal device.

29. The apparatus according to claim 17, wherein the roaming status information comprises one of information about whether the terminal device is roaming and information about the network in which the terminal device is at that moment.

30. The apparatus according to claim 17, wherein said change comprises a received request for access bearer establishment.

31. The apparatus according to claim 17, wherein said detected change comprises a detected new service flow.

32. The apparatus according to claim 18, wherein the packet data based mobile communication network comprises an internet protocol based mobile communication network comprising one of a wireless local area network, a general packet radio service enabled mobile telecommunication network, and code division multiple access based network.

33. The apparatus according to claim 18, wherein the roaming status information comprises one of information about whether the terminal device is roaming and information about the network in which the terminal device is at that moment.

34. The apparatus according to claim 18, wherein said change comprises a received request for access bearer establishment.

35. The apparatus according to claim 18, wherein said detected change comprises a detected new service flow.

36. The apparatus according to claim 34, wherein the apparatus is further configured to receive, when the roaming status information changes during the access bearer establishment, changes in the roaming status information, and wherein the session controller is further configured to amend the service policy correspondingly.

37. The apparatus according to claim 35, wherein the apparatus is further configured to receive, when the roaming status information changes during the detected service flow, changes in the roaming status information, and wherein the session controller is further configured to amend the service policy correspondingly.

38. The apparatus according to claim 18, wherein the session controller comprises pre-configured data to be utilized in generating the service policy, said pre- configured data comprising roaming status specific attributes.

* * * * *